United States Patent [19]

Barnert

[11] 4,387,120
[45] Jun. 7, 1983

[54] GAS INJECTOR FOR FLUIDIZED BED FURNACE

[75] Inventor: Eike Barnert, Julich, Fed. Rep. of Germany

[73] Assignee: Kernforschungsanlage Julich GmbH, Julich, Fed. Rep. of Germany

[21] Appl. No.: 239,592

[22] Filed: Mar. 2, 1981

[30] Foreign Application Priority Data

Feb. 29, 1980 [DE] Fed. Rep. of Germany ....... 3007711

[51] Int. Cl.³ ............................................. F27B 15/10
[52] U.S. Cl. ...................................... 427/213; 427/6; 118/DIG. 5; 118/303
[58] Field of Search ................. 118/716, DIG. 5, 303; 427/6, 213

[56] References Cited

U.S. PATENT DOCUMENTS

| 4,056,641 | 11/1977 | Huschka | 427/6 |
| 4,080,927 | 3/1978 | Brown | 118/716 |
| 4,259,925 | 4/1981 | Barnet | 118/716 |

FOREIGN PATENT DOCUMENTS

| 2102438 | 8/1972 | Fed. Rep. of Germany | 427/6 |
| 659048 | 10/1951 | United Kingdom . | |
| 1362656 | 12/1974 | United Kingdom | 118/DIG. 5 |
| 1477493 | 6/1977 | United Kingdom . | |
| 1488347 | 10/1977 | United Kingdom . | |
| 1522162 | 8/1978 | United Kingdom . | |
| 2036273 | 6/1980 | United Kingdom . | |

Primary Examiner—Sam Silverberg
Attorney, Agent, or Firm—Shlesinger, Arkwright, Garvey & Dinsmore

[57] ABSTRACT

A fluidized bed furnace employed for depositing pyrolytic carbon or silicon carbide on nuclear fuel particles is supplied with an inert dilution gas and a decomposable coating gas. These are supplied by means of a gas injector having at least three pipes 4 for coating gas extending within a surrounding duct for a stream of dilution gas 6. This leads to a partition 2 at the base of the bed, having at least three apertures 3 for through passage of the gases.

5 Claims, 3 Drawing Figures

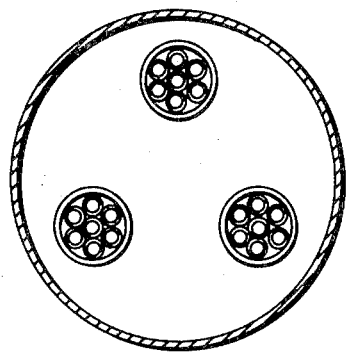
FIG. 2
FIG. 3
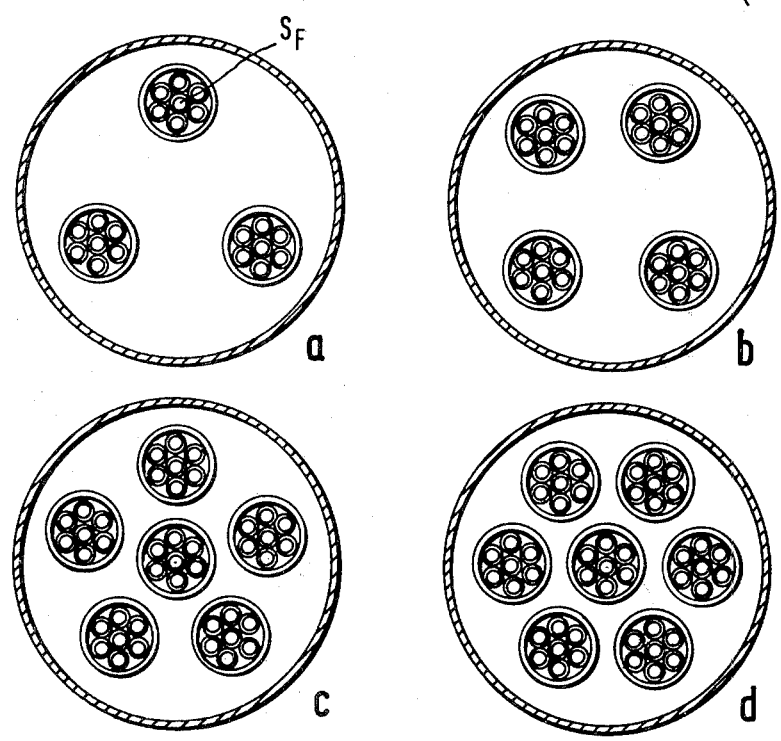

GAS INJECTOR FOR FLUIDIZED BED FURNACE

The invention relates to a gas injector for a fluidised bed furnace.

Nuclear fuel particles for use in high-temperature reactors are customarily coated with pyrolytic carbon or silicon carbide. This is effected by thermal decomposition of suitable substances in the gas phase in a fluidised bed containing the particles to be coated. The substances to be decomposed may be hydrocarbons such as acetylene, propylene or methane, or methyl trichlorosilane, with decomposition taking place at temperatures of 1000° to 2000° C. To produce a predetermined/desired movement of the bed, and to reduce the concentration of the coating gas, an inert dilution gas—generally argon—is supplied to the bed in addition to the coating gas.

These gases are fed into the fluidised bed furnace by means of suitable gas injectors or nozzles. Such a nozzle is described in our German Patent Specification No. 26 11 844 and corresponding U.K. patent specification No. 1555732.

The present invention is concerned with improving and further developing these known gas injectors.

Broadly this invention provides a gas injector having three or more supply pipes to convey coating gas, to form central or inner streams, housed in a common duct which serves to convey dilution gas. Accordingly the invention provides a gas injector for a fluidised bed furnace having at least three apertures for the passage of dilution gas and coating gas into the bed.

The advantages of this gas injector are:

The provision of a plurality of supply pipes makes it possible to increase the supply of coating gas by aggregating the individual inner streams formed by the coating gas. In this way the batch size of the particles to be coated can be correspondingly increased, which results in a reduction of the cost of the coating.

By division of the coating gas among a number of central streams, and thus among a number of gas entry locations a more uniform distribution of the coating gas in the fluidised bed is achieved. This can improve the coating operation and the quantity of the coating materials. For example it can give more uniform particle shape, more uniform coating thickness and density from particle to particle, and a lower anisotropy factor. In addition, the deposition efficiency is increased due to the more uniform distribution of the coating gas in the fluidised bed.

Preferred embodiments of the invention will now be described with reference to the accompanying drawings, in which:

FIG. 2 shows in horizontal section the arrangement of supply pipes in the gas injector of FIG. 1; and FIG. 3 a-d are similar views to FIG. 2, showing different arrangements of supply pipes.

Figure 1:
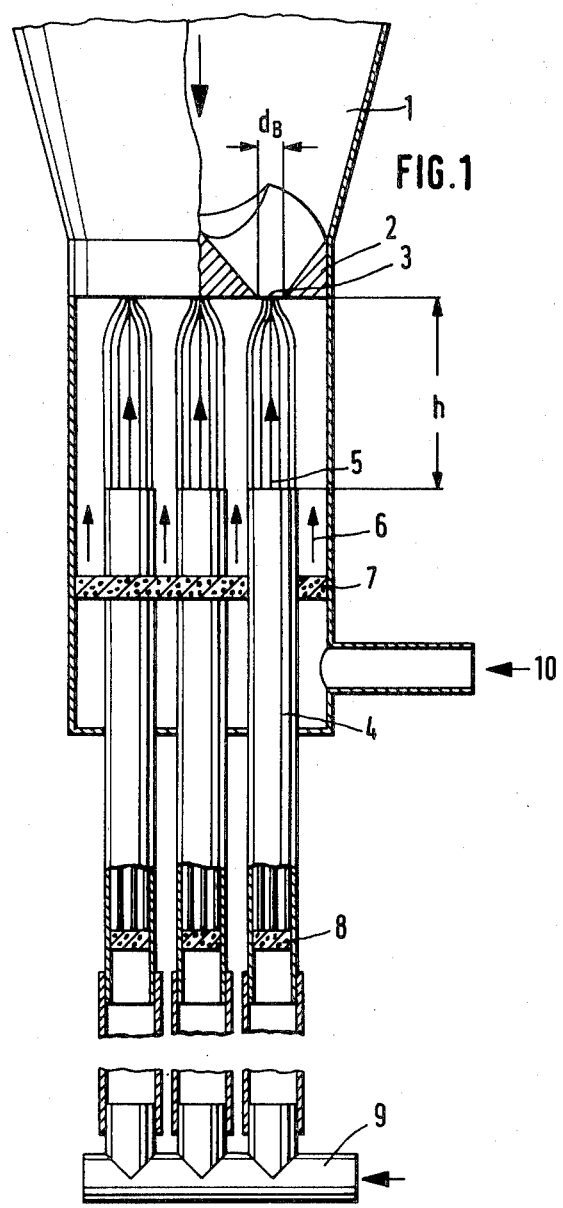
FIG. 1 shows diagrammatically, and in vertical section, a gas injector embodying the invention.

Referring first to FIG. 1, the fuel particles to be coated are situated in the conical holder 1, which is separated from the space beneath by partition member 2.

In the partition member 2 there are an appropriate number of apertures 3 which open conically towards the top. Beneath the partition member 2, there is a duct with circular cross section, through which dilution gas is supplied to the particle bed. Within this duct are several supply pipes 4 which convey coating gas.

The coating gas leaves the supply pipes 4 at a distance h from the apertures 3 in the partition member 2, forms laminar central jets 5 and—more or less contracted by the surrounding dilution gas stream 6—passes through the apertures 3 into the fluidised bed. In the circular duct which guides the somewhat annular dilution gas stream 6 there is a porous plate 7 which ensures a radially uniform velocity profile of this gas stream 6.

The supply pipes 4 are axially displaceable in order to set the required distance h. These pipes 4 may each consist of a single pipe or a bundle of pipes as illustrated in FIGS. 2 and 3. In either case there is a porous plate 8 at the lower end of each supply pipe 4 extending across the bore of the pipe. All of these plates give a particular equal pressure drop $\Delta p$ so that the coating gas is admitted equally to all the feed pipes 4 from only one duct 9. The dilution gas enters by way of the duct 10.

In order that the gas streams are not affected by the movements of the fluidised bed, the apertures 3 in the partition member 2 should be so dimensioned that the pressure drop which they produce is greater than the maximum fluctuation of pressure in the fluidised bed. In the case in question this is achieved with diameters $d_B$ of the apertures 3 not greater than 7 mm.

It is advantageous for the arrangement of the supply pipes 4 in the circular duct which surrounds them to be as diagrammatically illustrated in the examples of FIG. 3. It has been found preferably for the longitudinal axis of the supply pipes to extend through the centre of gravity $S_F$ of the equal-sized, symmetrically arranged, cross-sectional areas of the surrounding circular duct which are defined by the number of the supply ducts.

I claim:

1. A fluidized bed furnace, comprising:
   a. a furnace cone;
   b. a gas injector;
   c. said gas injector comprising a duct for conveying a dilution gas to said fluidized bed;
   d. at least three parallel coating gas supply pipes within said duct, said pipes having ends and said pipes being substantially symmetrically spaced in said duct;
   e. an aperture insert plate closing the furnace end of said duct;
   f. said aperture insert plate being spaced from the ends of said pipes;
   g. said insert plate having at least three supply pipes corresponding conical orifices opening into said furnace cone.
   h. each supply pipe being axially aligned with and axially spaced from the corresponding one of said orifices in said insert plate;
   i. pressure regulating means for conveying said dilution gas laminarly about said pipes and beyond said pipe ends; and,
   j. pressure regulating means for conveying said coating gas through said pipes and beyond said pipe ends, whereby said coating gas is laminarly surrounded by said dilution gas when exiting from said pipe ends and prior to entering said apertures.

2. A fluidized bed furnace as defined in claim 1, wherein:
   a. each of said supply pipes comprises a bundle of smaller pipes.

3. A fluidized bed furnace as defined in claim 1, wherein:

a. each of said supply pipes is fed with said coating gas from a single coating gas supply duct.

4. A fluidized bed furnace as defined in claim 3, wherein:
 a. each of said supply pipes and said gas dilution duct include pressure regulating means.

5. A fluidized bed furnace as defined in claim 4, wherein:
 a. said pressure regulating means comprises a porous plug in each of said supply pipes and in said gas dilution duct.

* * * * *